May 16, 1939.  A. N. PLANTE  2,158,831
NEST STRUCTURE
Filed April 24, 1937  3 Sheets-Sheet 1
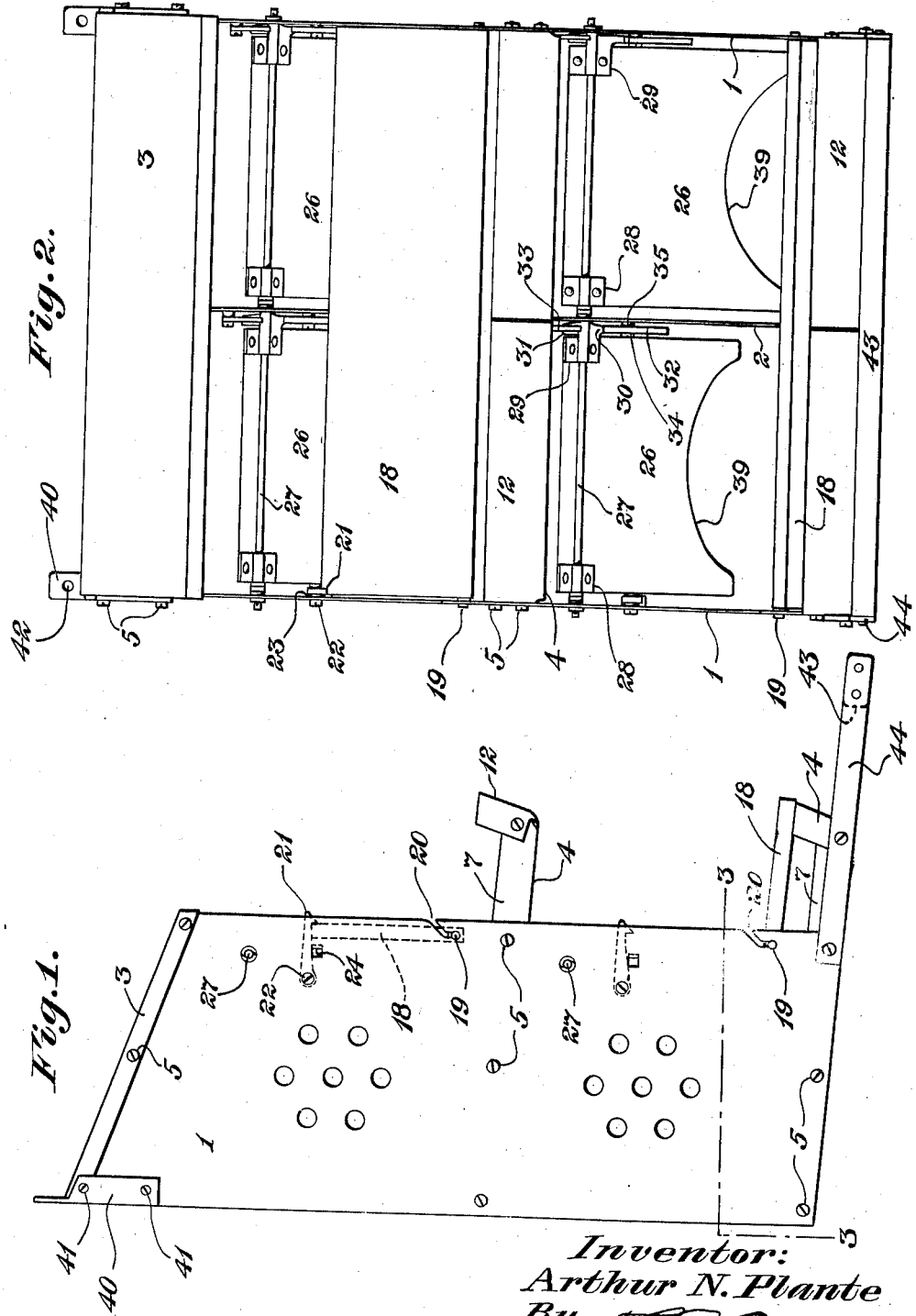
Inventor:
Arthur N. Plante
By F. E. Anderson
His Attorney

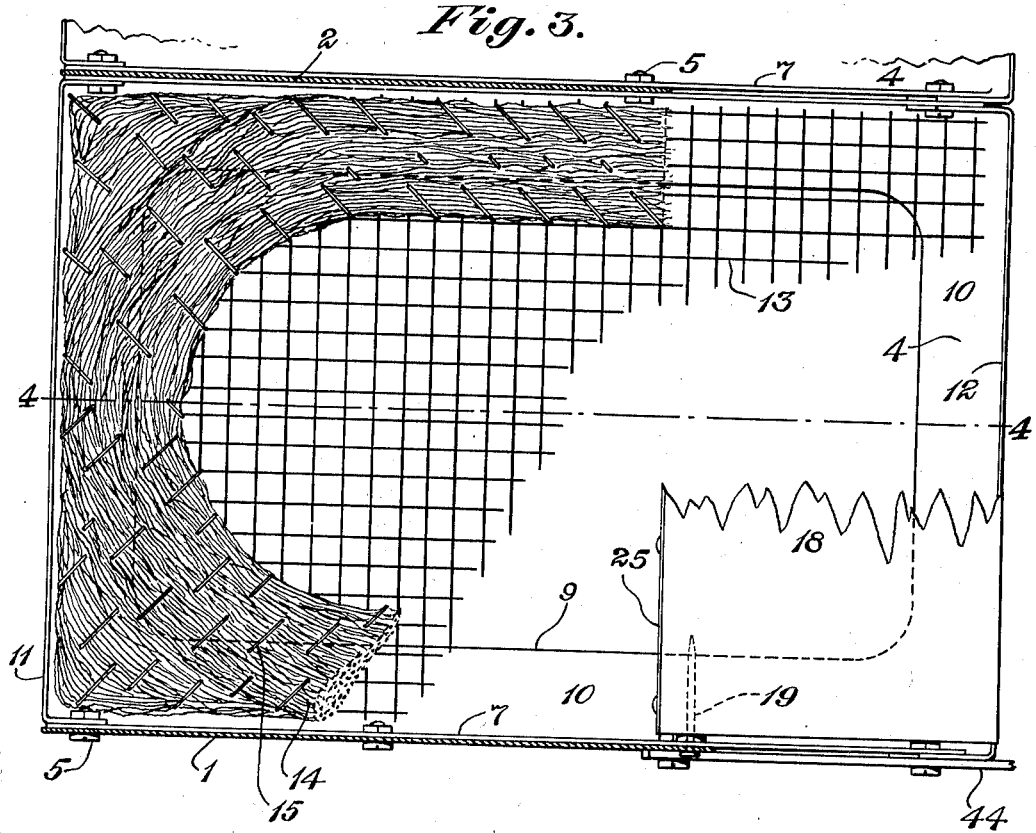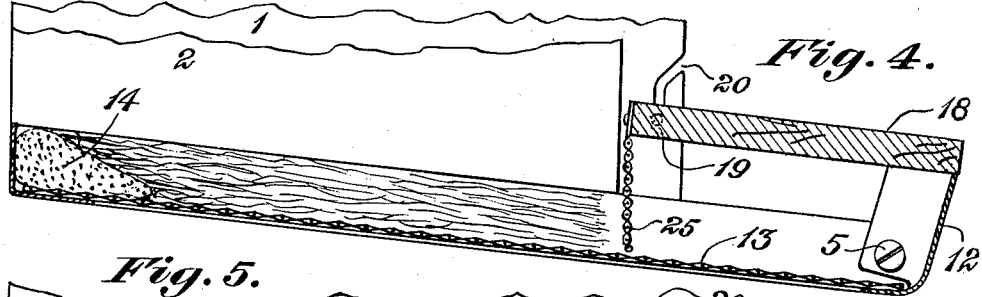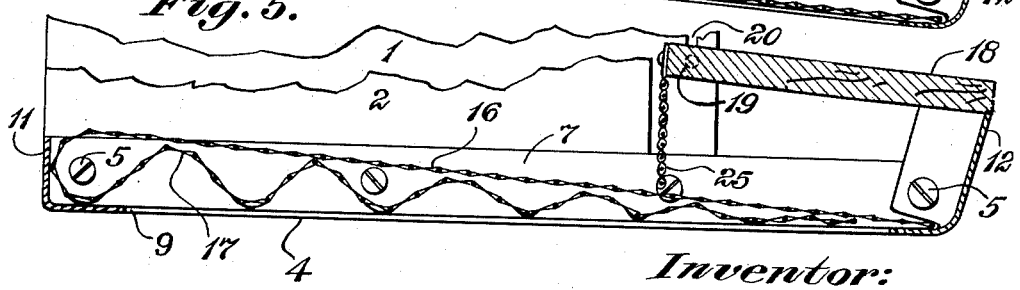

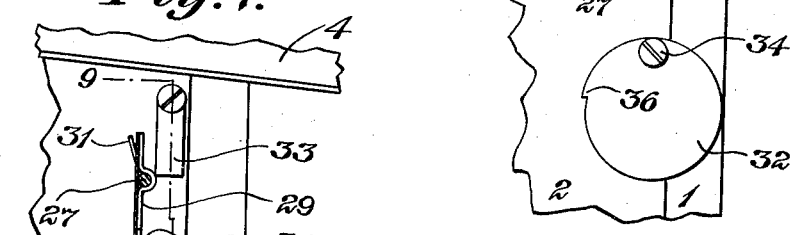
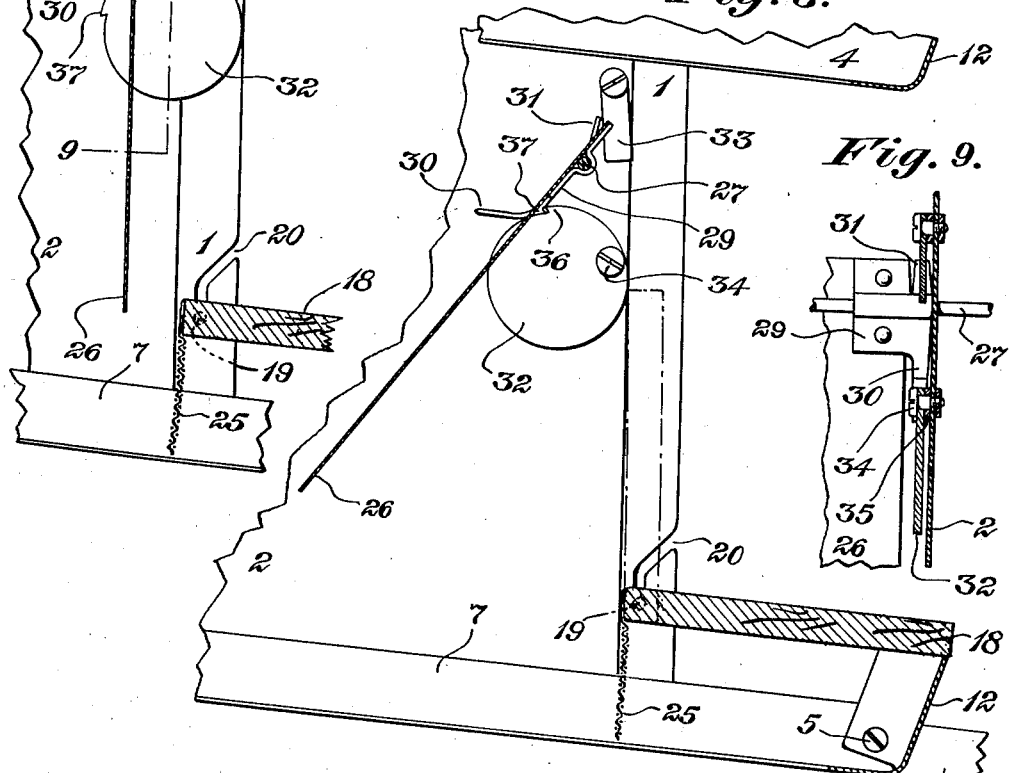
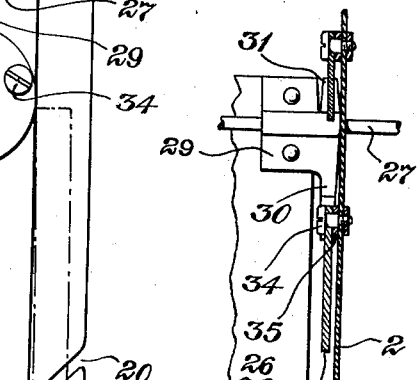

Patented May 16, 1939

2,158,831

UNITED STATES PATENT OFFICE 2,158,831

NEST STRUCTURE

Arthur N. Plante, Winsted, Conn.

Application April 24, 1937, Serial No. 138,710

8 Claims. (Cl. 119—47)

This invention relates to nest structures of the type designed to be hung or otherwise supported against the wall of a poultry house. Such a wall may be let to serve as the rear wall of nest chambers which are completed in their formation by upright end and partition members, a top cover and nest supporting frame members which are interposed between the uprights. The series of chambers thus formed may be arranged in tiers one above the other and extended laterally to provide any suitable number of nests according to capacity desired.

One object of my invention is the provision of a nest structure comprising simple and inexpensive parts that may be readily assembled for use and as conveniently disassembled to facilitate storage, shipment and cleansing of the parts.

Another object of the invention is the provision of a hen trapping closure associated with each nest together with simple mechanism by which the closure may be controlled.

A further object is the provision of egg trapping compartments arranged in front of a series of nests, and association with the compartments of a cover board movable from position where the egg compartments are closed thereby into position to close the nest chambers, the board being effective, in approaching the latter position, to "set" the hen trapping devices of said nests.

With these and other objects in view my invention consists in particular features of construction, formation, combination and arrangement of parts which are more fully set forth in the following description and illustrated in the accompanying drawings while the novelty of the invention is defined in the appended claims.

In the drawings,

Figure 1 is an end view of a nest structure of the type adapted to embody the features of my invention.

Figure 2 is a front view of the nest structure shown in Fig. 1.

Figure 3 is a sectional plan view on line 3—3 of Fig. 1.

Figure 4 is a sectional view on line 4—4 of Fig. 3.

Figure 5 is a view similar to Fig. 4 but showing a modified form of certain elements shown in Fig. 4.

Figure 6 is a view partly in section of a trap door and associated parts, the door being shown in extreme open position.

Figure 7 is a view similar to Fig. 6 showing trap door in closed position.

Figure 8 is a view similar to Fig. 6 showing trap door in "set" position.

Figure 9 is a sectional detail view on line 9—9 of Fig. 7.

Referring to the drawings, the main elements of the nest structure illustrated, include ends 1, partition 2, top or cover 3 and nest supporting frame members 4, all of which preferably but not necessarily are formed of sheet metal as shown. Providing for convenient assembly of these parts, bolts 5 may be employed for securing them together. The bolts are inserted in registering holes respectively in the ends and partition members and adjacent side flanges 7 of the nest frames 4.

It will be understood that nest frames 4 form lateral spacing members between uprights comprising ends 1 and partition or partitions as 2. More explicitly defined the nest frames 4 are tray-like in form with an opening 8 in the bottom which leaves merely a comparatively narrow margin 10 adjacent the aforesaid side flanges 7, a similar rear flange 11 and a front flange 12, the latter being somewhat higher than the other flanges and terminating a forward portion of the frame which extends out in front of a respective nest chamber to form an egg receiving compartment as will more fully appear. To form a bottom for a nest frame, a sheet as 13, preferably of foraminous material may be employed. This member 13 serving as a bottom for both the nest chamber and egg compartment simply rests for support on margin 10 of the nest frame and may be removed readily for cleaning or for replacement of padding material such as 14, which in some suitable manner as by lacing 15, is preferably secured to the foraminous sheet in an arrangement to simulate a natural nest as of hay or straw. As shown in Figs. 3 and 4 this nest padding is omitted at the front of the nest chambers thereby leaving an opening from the laying or nest chamber which is directed toward its respective egg receiving compartment. To permit gravity to move or cause eggs to roll from a nest into an egg receiving compartment the nest frames may be secured in place at a suitable inclination to tilt or slope the nest bottom towards the front. The same effect however may be secured by attaching the nest frames in horizontal relation and forming the nest bottoms as shown at 16 (see Fig. 5) that is to say by folding over a portion of the bottom forming sheet 17 to the rear and bending it into flutes of diminishing height toward the front. In other words the lower ply of material is formed into separated or spaced areas for contacting the upper ply, said areas being of different heights to thereby provide for the upper ply a support tapering in thickness between opposite edges.

A cover for normally closing the top of the egg receiving compartments but also operable to perform another function will now be described. For this purpose a cover forming board as 18 may be provided for each tier of nests. The length of each board is preferably such that it extends from inner side to inner side of respective ends 1 with sufficient clearance adjacent each end to permit the board to be moved to the vertical position indicated in dotted lines in Figs. 1 and 8. Such movement of a board 18 is provided for by mounting it to swing about an axis established by pivot pins 19 which engage the vertical portion of slots 20 formed in respective ends 1. Obviously the arrangement of the pin and slot connections indicated permits convenient removal and replacement of the boards. Endwise movement of the latter may be prevented by washers placed on pins 19. Movement of a board as thus supported about its axis of support is limited to the substantially horizontal position as shown in Figs. 1, 4, 5 and 8 and the vertical position indicated in Figs. 1 and 8. In the former or egg compartment closing position of a board its free edge rests upon the forward flange 12 of respective nest frames 4. In its other extreme or substantially vertical position a board engages the front of its respective partition member or members as 2 which serve as a stop and in this position the board forms a barrier to prevent exit of any hens that may be in respective nest chambers. A latch as 21 may be provided to engage and hold a board 18 in nest closing or vertical position. As shown this latch is mounted on a bolt or stud 22 extended through an end member and carrying a washer 23 to suitably space the latch from its support. Also a stop is provided for holding the latch in suitable position by punching a lug 24 from the end member.

Inasmuch as open space at the rear of egg receiving compartments might reveal eggs therein to hens in the nests tending to cause investigating activity leading to undesirable results, a flexible curtain or fringe 25 is secured to the rear edge of boards 18. This curtain permits eggs to roll freely from the nests into receiving compartments but screens them from the hen's view as soon as they have left the nests.

In addition to the egg trapping arrangement above set forth as associated with my improved nest structure I prefer to also provide means with each nest that may be independently rendered effective or ineffective for trapping hens that have entered therein. For this purpose each nest is provided with a door as 26 which is freely hinged as on a stationary pintle rod 27 which may be extended along a tier of nests and supported in aligned perforations in the ends 1 and partition members as 2 so that each door normally hangs in substantially vertical position across a respective nest entrance. With each door is associated both means for holding it in "set" position and means for holding it in extreme open position. In the "set" position (see Fig. 8) the door is held partly open by a trigger device about to be described so that as a hen enters the nest the trigger is released and the door closes thereby trapping the hen. When the trap is thus sprung any pressure on the inside of the door simply moves the lower edge thereof against the rear edge of the cover board 18 which serves as a stop. Means for holding the door in extreme open position is provided for use as a convenience when releasing a hen or when it may be desirable to hold the door continuously open for a period during which trapping function is omitted.

As identical door controlling means are employed with each nest the following description of one unit will be sufficient to convey an understanding of the arrangement suitable for a series of nests. The door 26 has secured thereto hinge members 28 and 29. Associated with the latter or forming a part thereof are arms 30 and 31 adapted to cooperate respectively with a trigger 32 and detent 33 secured to adjacent wall of a nest as by screw studs 34 each of which is provided with a washer 35 to suitably space its respectively supported element from said wall to thereby assure its being freely movable under influence of gravity to swing to the positions indicated as in Fig. 7. The arm 30 and trigger 32 are respectively formed with a catch shoulder or tooth 36 and 37. Thus if the trigger 32 is swung to the position shown in Fig. 8 its periphery will engage arm 30 and acting as a cam cause the door to open until catch tooth 36 is located to engage catch tooth 37 and hold the door in "set" position. Subsequently, as when a hen passes under the partly open door, the trigger 32 is released and the door swings to closed position. It is desirable to have the intermediate portion of the bottom of a door cut away as at 39 so that with the door in "set" position sufficient opening is presented to invite entrance of a hen.

To fully open a nest entrance and have it thus maintained while removing a hen or for such period as it may be desired to discontinue the nest as a trapping one the door may be swung upwardly until detent 33 engages the rear side of arm 31. Obviously such engagement of the detent will be effected automatically. Then when it is desired to free the door the detent is released manually.

It will be observed that when a cover board 18 is moved to the position shown in Fig. 9 it is effective to engage trigger 32 and move it to establish door 26 in "set" or hen trapping position. From this it will also be seen that a cover board for a series of nests is effective when opened to reset all nests of the series that may have been sprung.

As previously stated the nest structure illustrated is intended to be supported with its rear contiguous to a wall. It may be suspended in this relation by reinforcing bars 40 secured to end members 1 as by bolts 41, said bars being provided with holes 42 for engaging nails or studs driven into a wall. In order that hens may have easy access to an upper tier of nests as well as to provide an inviting approach to the lower one, a perch 43 is supported at suitable distance in front of the latter by brackets 44 secured to outer side flanges 7 of respective nest frames 4.

Having thus described my invention, what I claim is,

1. In a nest structure in combination with sheet metal top and upright end and partition members, nest frames interposed between the uprights to form nest chambers and extended in front of the nest chambers to form egg receiving compartments, said nest frames each comprising a bottom defining margin merging into a front flange and side flanges by which latter it may be removably secured to the uprights in sloping relation from rear to front, an egg compartment cover extended lengthwise from one end upright to the other, pivotal means for securing the cover to the end uprights whereby the cover may be swung from egg compartment closing position to nest chamber closing position in which latter the front edge of the partition member or members serves as stop means, and a latch associated with an upright for holding the cover in the nest chamber closing position.

2. In a nest structure in combination with sheet metal top and upright end and partition members, nest frames interposed between the uprights to form nest chambers and extended in front of the nest chambers to form egg receiving compartments, an egg compartment cover extending lengthwise from one end upright to the other, pivotal means for securing the cover to the end uprights whereby the cover may be swung open against the partition member or members, a door mounted for swinging movement at the front of each nest chamber and adapted normally to close by gravity, and means including a trigger associated with each nest chamber and operable for holding its respective door in partly open or "set" relation, each trigger being movable to engage and move its respective door in "set" relation and thus operable by the cover when the latter is moved to its open position.

3. In a nest structure in combination, a frame including uprights which form sides of a nest chamber, a door mounted for swinging movement at the front of the nest chamber and adapted normally to close by gravity, a pair of arms associated with the door, a trigger pivotally associated with the frame, and a detent pivotally associated with the frame, said trigger being operable about its axis to engage one arm and move the door from closed position to "set" position in which latter the trigger is effective to hold the door until it is further opened by other means, and the detent being operable to engage the other arm to thereby hold the door in extreme open position.

4. In a nest structure in combination, a frame member, and a bottom member formed of foraminous material adapted to form both a nest bottom and an egg compartment bottom adapted to be supported by the frame member, said material being folded upon itself and formed into flutes that are substantially parallel to the fold and of progressively varying height from one end toward the other.

5. A nest structure including in combination, a frame including uprights which form sides of a nest chamber, a nest bottom member supported by the uprights to form a nest chamber, said bottom member being extended in front of the nest chamber to form an egg receiving compartment, an egg compartment cover movable from egg compartment closing position to nest chamber closing position, a door for the nest chamber adapted normally to close by gravity, and a trigger operable by the egg compartment cover and engageable with the door to move the latter from closed position and to hold the door in "set" position.

6. In a nest structure in combination with upright end and partition members, nest frames interposed between the uprights to form nest chambers and extended in front of the nest chambers to form egg receiving compartments, a movable egg compartment cover extended lengthwise from one end upright to the other, a door mounted for swinging movement at the front of each nest chamber and adapted normally to close by gravity, and means including a trigger associated with each nest chamber and operable for holding its respective door in partly open or "set" relation, each trigger being movable to engage and move its respective door into "set" relation and thus operable by the cover when the latter is moved from its egg compartment closing position.

7. In a nest structure in combination with upright end and partition members, nest frames interposed between the uprights to form nest chambers and extended beyond the nest chambers to form egg receiving compartments, a door mounted for swinging movement at the front of each nest chamber and adapted normally to close by gravity, a trigger for each door associated with the frame, a detent for each door associated with the frame, each trigger being operable to engage a respective door and move it from closed position to "set" position in which latter the trigger is effective to hold the door until it is further opened by other means, and each detent being operable to engage its respective door and hold it in extreme open position, and an egg compartment cover extended from one end upright to the other, said cover being movable to engage and actuate the triggers and thereby to establish the doors and their respective triggers in "set" relation.

8. In a nest structure in combination, a frame member, and a bottom member formed of foraminous material adapted to form both a nest bottom and an egg compartment bottom suitable for support by the frame member, said bottom member comprising two superimposed plies of material with one of the plies formed into separated areas of different height for contacting the other ply.

ARTHUR N. PLANTE.